United States Patent
Yadav

(10) Patent No.: US 10,259,894 B1
(45) Date of Patent: Apr. 16, 2019

(54) OXYGEN PERMEABLE POLYMERS, IONOMERS AND METHODS OF MAKING THE SAME

(71) Applicant: Nissan North America, Inc., Franklin, TN (US)

(72) Inventor: Rameshwar Yadav, Novi, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 15/717,038

(22) Filed: Sep. 27, 2017

(51) Int. Cl.
| | |
|---|---|
| *C08F 12/30* | (2006.01) |
| *C08F 8/32* | (2006.01) |
| *B01J 39/20* | (2006.01) |
| *B01D 71/32* | (2006.01) |
| *B01D 71/28* | (2006.01) |
| *H01M 4/86* | (2006.01) |
| *C08F 8/28* | (2006.01) |
| *B01D 53/22* | (2006.01) |

(52) U.S. Cl.
CPC ............ *C08F 12/30* (2013.01); *B01D 53/228* (2013.01); *B01D 71/28* (2013.01); *B01D 71/32* (2013.01); *B01J 39/20* (2013.01); *C08F 8/28* (2013.01); *C08F 8/32* (2013.01); *H01M 4/8663* (2013.01)

(58) Field of Classification Search
CPC ..... C08F 12/30; C08F 8/32; C08F 8/28; B01J 39/20; B01D 71/32; B01D 71/28; B01D 53/228; H01M 4/8663
USPC .......................................................... 521/32
See application file for complete search history.

(56) References Cited

U.S. PATENT DOCUMENTS

| | | | |
|---|---|---|---|
| 9,250,552 B2 * | 2/2016 | Inoue | ..................... C08F 12/22 |
| 9,539,568 B2 | 1/2017 | Merlo et al. | |
| 2013/0047844 A1 | 2/2013 | Zheng et al. | |

FOREIGN PATENT DOCUMENTS

JP        05066576 A    *   3/1993

OTHER PUBLICATIONS

Manecke et al. "Polymers of hydroquinone sulfonamides. 1. Monomers, and model compounds", Makromolekulare Chemie (1971), 145, 53-66. (Year: 1971).*

* cited by examiner

*Primary Examiner* — Michael Bernshteyn
(74) *Attorney, Agent, or Firm* — Young Basile Hanlon & MacFarlane, P.C.

(57) ABSTRACT

An oxygen permeable polymer has the following formula:

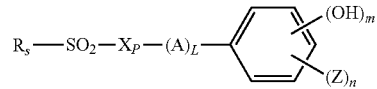

wherein $R_S$ is a non-sulfonyl halide portion of a sulfonyl halide monomer or polymer; $X_P$ is —NH or —NHCO; A is an optionally substituted alkyl; L is 0, 1 or 2; m is 2 or 3; Z is H or $CH_3$; and n is 5-m. The polymer can be used in air separation devices, air concentrators, and in electrodes for electrochemical devices.

20 Claims, No Drawings

OXYGEN PERMEABLE POLYMERS, IONOMERS AND METHODS OF MAKING THE SAME

TECHNICAL FIELD

This disclosure relates to improved oxygen permeable monomers, polymers and ionomers and methods of making the same.

BACKGROUND

Oxygen is used in many electrochemical devices such as fuel cells and lithium air batteries. Oxygen is also used in fuel combustion systems that have innumerable applications including internal combustion engines, space crafts, and submerged vehicles. Air, which is typically used as the oxygen source, has only 21% oxygen, which limits the performance of these devices. Increasing the oxygen molar concentration above 21% would enhance the power density and efficiency of these devices. Air separation technologies exist, but have limited selectivity of oxygen and are non-ionic and do not provide improved conduction of ions.

Conventional ionomers used in electrocatalyst in electrochemical devices conduct protons well, but poorly transport oxygen. Improved oxygen transport through electrodes of electrochemical devices would improve performance.

SUMMARY

Disclosed herein are oxygen permeable monomers, polymers, co-polymers and ionomers for use in electrochemical devices such as fuel cells and batteries, and also for use in air separation devices or oxygen concentrators. Methods of making the oxygen permeable monomers, polymers, co-polymers and ionomers are also disclosed.

An embodiment of an oxygen permeable polymer disclosed herein has the following formula:

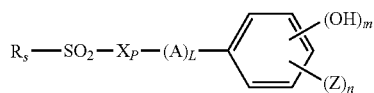

wherein $R_s$ is a non-sulfonyl halide portion of a sulfonyl halide monomer or polymer; $X_P$ is —NH or —NHCO; A is an optionally substituted alkyl; L is 0, 1 or 2; m is 2 or 3; Z is H or $CH_3$; and n is 5-m.

An embodiment of an oxygen-conducting and a proton-conducting ionomer disclosed herein has the following formula:

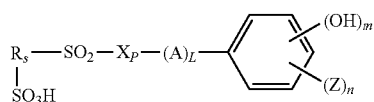

wherein $R_s$ is a non-sulfonyl halide portion of a sulfonyl halide monomer or polymer; $X_P$ is —NH or —NHCO; A is an optionally substituted alkyl; L is 0, 1 or 2; m is 2 or 3; Z is H or $CH_3$; and n is 5-m A method of making an oxygen permeable monomer or polymer as disclosed herein comprises reacting under a mild base condition a sulfonyl halide monomer or polymer (1) with an oxygen absorbing compound (2) to produce the oxygen permeable polymer (3):

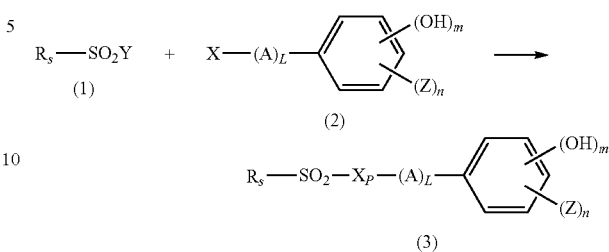

wherein $R_S$ is a non-sulfonyl halide portion of the sulfonyl halide monomer or polymer and Y is F or Cl; X is —$NH_2$, —COOH, —COOR, or —COH and R is an ester or an ether; A is an optionally substituted alkyl; L is 0, 1 or 2; m is 2 or 3; Z is H or $CH_3$; n is 5-m; and $X_P$ is —NH or —NHCO. When X is —COOH, —COOR or —COH, the reacting comprises first treating the sulfonyl halide monomer or polymer with ammonia to convert a sulfonyl halide portion to a sulfonamide.

DETAILED DESCRIPTION

In electrochemical devices, the concentration of oxygen and the transport of oxygen molecules to reaction sites directly determine the power density output of these devices. In these devices, oxidized ions such as $H^+$ and $Li^+$ ions migrate from anode to cathode to react with oxygen to complete the electrochemical reaction.

Besides the natural fixed oxygen concentration when using air, oxygen is also limited by transport resistance due to dense and non-permeable polymeric ionomers and binders in active cathode materials. The cathode structure is intricate and uses dense polymeric ionomers and polymeric binders to hold together loose electrocatalyst particles. The polymeric ionomer also need to conduct ions such as $H^+$ and $Li^+$ to the reaction sites. Conventional ionomers such as those manufactured as Nation® and Aquivion®, or manufactured by 3M, have limited oxygen permeability and also inhibit the oxygen transport to the reaction sites. These fluorinated compounds, which form conventional ionomers, play the dual roles of electrolyte/membrane in which there should be no oxygen transport, and binder in the electrode which should facilitate oxygen transport. Conventional ionomer material is unable to meet the demand of both electrolyte/membrane and binder.

The materials disclosed herein have high oxygen transport properties due to covalent linking of various oxygen-absorbing functional groups. This new class of material, which can be a monomer, polymer, or co-polymer or further formulated into an ionomer, addresses the need for a highly oxygen permeable material that can be used in electrochemical devices. The materials disclosed herein can be used to promote oxygen transport in fuel cells devices such as PEMFC, AFC, SOFC, MCFC, and electrochemical cells such as metal-air, Li-air, Mg-air, Zn-air, Al-air, K-air, Na-Air, Fe-air, Si-air.

The materials disclosed herein also address the challenges of air separation technologies in which current air separation materials have very limited oxygen permeability. This leads to low air separation efficiency. The oxygen permeable monomers, polymers or co-polymers disclosed herein can be used as air-separation membranes, air-separation filters, air-separation particles, etc. in applications such as fuel combustion and oxygen enhanced combustion devices in spacecraft, rocket, and submerged vehicles, as non-limiting examples, medical devices and therapies, oxygen therapy, chemical production such as hydrogen peroxide, ethylene oxide, sulfuric acid and nitric acid, steel industry processes, cutting processes, oxy-acetylene welding, melting of metals, wastewater and effluent treatment processes.

An oxygen permeable polymer disclosed herein has the following formula:

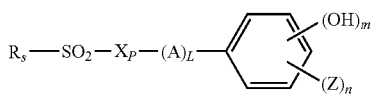

wherein $R_s$ is a non-sulfonyl halide portion of a sulfonyl halide monomer or polymer; $X_P$ is —NH or —NHCO; A is an optionally substituted alkyl; L is 0, 1 or 2; m is 2 or 3; Z is H or $CH_3$; and n is 5-m.

As used herein, "oxygen permeable" means oxygen can diffuse through the polymer. This property provides a polymer that can be used to transport oxygen through electrodes by allowing the oxygen to diffuse through the material rather than obstruct the material. This property provides a polymer that can preferentially diffuse oxygen over nitrogen, thereby concentrating the oxygen that diffuses through the material, and separating the oxygen from the nitrogen.

As used herein, the term "polymer" includes co-polymers. When $R_s$ is a non-sulfonyl halide portion of a sulfonyl halide monomer, the resulting oxygen permeable monomer is polymerized by processes known to those skilled in the art to form the oxygen permeable polymer. Polymerization can occur prior to reacting the precursor. The polymer precursor can be reacted to form the oxygen permeable monomer and then polymerized. As non-limiting examples, a polymer precursor can be a polymer or co-polymer that does not need to be polymerized. The polymer precursor can be a polymer or co-polymer that requires additional polymerization.

To produce the oxygen permeable polymer, a sulfonyl halide monomer or polymer (1) is reacted under mild base conditions with an oxygen absorbing compound (2) to produce the oxygen permeable polymer (3), as shown in the reaction below:

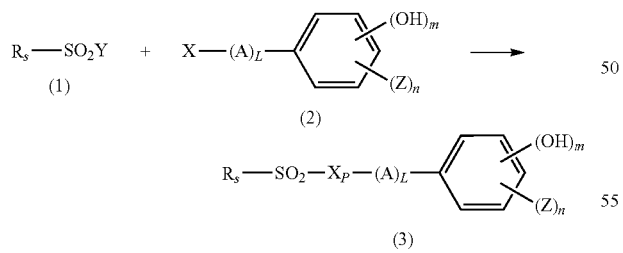

In the sulfonyl halide monomer or polymer (1), $R_s$ is the non-sulfonyl halide portion of the sulfonyl halide monomer or polymer and Y is F or Cl.

In the oxygen absorbing compound (2), X is —$NH_2$, —COOH, —COOR, or —COH and R is an ester or an ether; A is an optionally substituted alkyl; L is 0, 1 or 2; m is 2 or 3; Z is H or $CH_3$; and n is 5-m.

When X is —COOH, —COOR or —COH in the oxygen absorbing compound, the sulfonyl halide monomer or polymer is first treated with ammonia to convert the sulfonyl halide portion to a sulfonamide, as shown below. When X is —$NH_2$ in the oxygen absorbing compound, there is no need to convert the sulfonyl halide portion of the monomer or polymer.

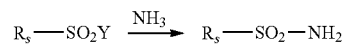

The sulfonyl halide monomer or polymer can be any hydrocarbon, partial hydrocarbon, perfluorocarbon, fluorinated, partially fluorinated polymer, co-polymer or monomer. Non-limiting examples include: Nafion™ polymer or resins in $SO_2F$ form; Aquivion™ polymer or resins in $SO_2F$ form; polymer, co-polymer or monomer of 2-allyloxy-1,1,2,2-tetrafluoro ethane sulfonyl fluoride; polymer, co-polymer or monomer of 4-(trifluorovinyl) benzene sulfonyl fluoride; polymer, co-polymer or monomer of p-styrene sulfonyl fluoride/chloride; polymer, co-polymer or monomer of perfluoro (3-oxapent-4-ene) sulfonyl fluoride; polymer, co-polymer or monomer of ethene sulfonyl fluoride; polymer, co-polymer or monomer of 2-propene-1-sulfonyl chloride; and polymer, co-polymer or monomer of perfluoro (4-methyl-3,6-dioxaoct-7-ene) sulfonyl fluoride, polymer, co-polymer or monomer of 1,1,2,2-tetrafluoro-2-[(1,1,2,2-tetrafluoro-3-butenyl)oxy]-ethane sulfonyl fluoride. Other sulfonyl halide monomers and polymers that can be used herein are disclosed in U.S. Pat. Nos. 9,403,746; 9,350,035; 9,212,246; and 9,694,357.

Formulas of sulfonyl halide monomers or polymers that will produce the oxygen permeable polymer (3) are shown as non-limiting examples below:

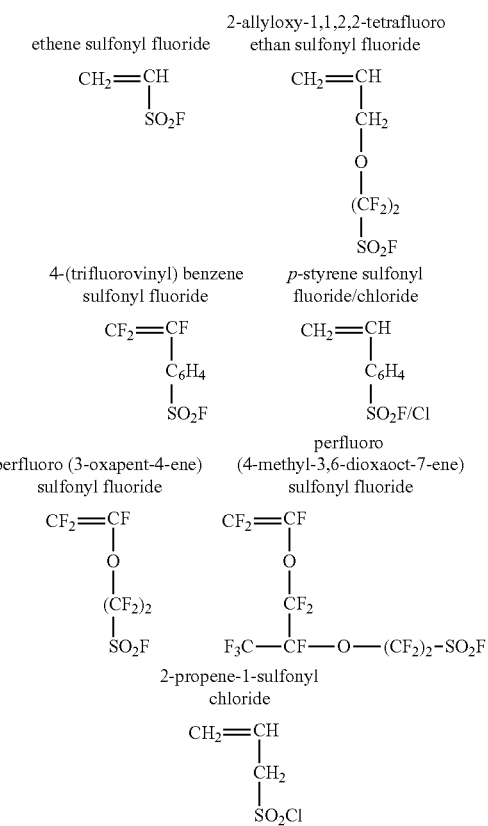

1,1,2,2-tetrafluoro-2-[(1,1,2,2,-tetrafluoro-3-butenyl)oxy]-ethane sulfonyl fluoride

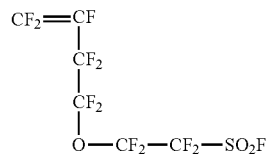

The oxygen absorbing compound can be a benzoic acid-based compound, where X is —COOH or —COOR, and R is an ether or an ester. Non-limiting examples of a benzoic acid-based oxygen absorbing compound include gallic acid, an ester of gallic acid, an ether of gallic acid, 2,4,5-trihydroxybenzoic acid, 2,3,4-trihydroxybenzoic acid, and 3,4,5-trihydroxybenzoic acid.

The oxygen absorbing compound can be an aldehyde-based compound, where X is —COH. Non-limiting examples of an aldehyde-based oxygen absorbing compound include 3,4,5-trihydroxybenzaldehyde, 2,4,5-trihydroxybenzaldehyde, 2,3,4-trihydroxybenzaldehyde, 2,4,6-trihydroxybenzaldehyde, 2,3,6-trihydroxybenzaldehyde, 2,3,5-trihydroxybenzaldehyde and 2,3,4-trihydroxyacetophenone.

When the oxygen absorbing compound is a benzoic acid-based compound or an aldehyde-based compound, the sulfonyl halide monomer or polymer is treated with ammonia to convert a sulfonyl halide portion to a sulfonamide prior to reacting the sulfonyl halide monomer or polymer with the benzoic acid-based compound or the aldehyde-based compound.

The oxygen absorbing compound can be an amine-based compound, where X is —NH$_2$. Non-limiting examples of an amine-based oxygen absorbing compound include 5-(2-aminoethyl)-pyrogallol, 5-(aminomethyl)benzene-1,2,4-triol, 5-(aminomethyl)benzene-1,2,3-triol, 5-(2-aminoethyl)-6-methylbenzene-1,2,4-triol, 5-(2-aminoethyl)-3-methylbenzene-1,2,4-triol, 5-(2-aminoethyl)-3,6-dimethylbenzene-1,2,4-triol, 5-(2-amino-1-hydroxyethyl)-1,2,4-benzenetriol, 4-aminobenzene-1,2,3-triol, 2,3,5-trihydroxyphenethylamine, 3,4-dihydroxyphenethylamine, 3,4,5-trihydroxyphenethylamine, 2-hydroxydopamine and 5-hydroxydopamine.

When an amine-based oxygen absorbing compound is used, there is no need to convert the sulfonyl halide portion of the monomer or polymer to a sulfonamide as the amine constituent is already present.

Other oxygen absorbing compounds are contemplated herein. Non-limiting examples include 2-pyridylamidoxime, 3-pyridylamidoxime, 4-pyridylamidoxime, 4-methylbenzamide oxime, PFPE (perfluoro polyether) amine, diamine or any other PFPE based amines, hydrocarbon, fluorinated or fluorine treated polyethylene glycol (PEG) and polyethylene oxide (PEO) based compound, any single-arm or multi-arm primary amine or carboxylic acid, and hydrocarbon and fluorinated or fluorine treated of the following: poly(ethylene glycol) bis(amine), amino-(PEG)$_n$-OH, hydroxyl-(PEG)$_n$-amine (HO-(PEG)$_n$-NH$_2$), Y shape (PEG)$_n$ amine (Y-(PEG)$_n$-NH$_2$), O-(2-aminoethyl)polyethylene glycol (PEG)n, fluorinated poly(ethylene glycol)2-aminoethyl ether acetic acid, 4arm-(PEG)n-amine, 2arm-(PEG)n-amine, 3arm-(PEG)n-amine, 1arm-(PEG)n-amine or multi-arm (PEG)n-amine, methoxy (PEG)n-amine, 4arm-(PEG)n-glutaric acid, multi arm-PEG)n-glutaric acid, multi arm-PEG) n-COOH acid PEG carboxylic acid, PEO carboxylic acid, and NH$_2$-(PEG)$_n$-COOH, where n is obtained by molecular weight.

To react the sulfonyl halide or sulfonamide of the monomer or polymer with the oxygen absorbing compound, the monomer or polymer is soaked in a solvent such as acetonitrile, water or any other organic solvent. A mild base condition is formed by adding an organic or inorganic base such as pyridine, K$_2$CO$_3$, KOH or NaOH. The oxygen absorbing compound is added to the mixture and reacted below 100° C. for at least twelve hours to achieve satisfactory conversion to the oxygen permeable polymer. In particular, the reaction can be performed at a temperature between about 90° C. and 100° C. The oxygen permeable polymer can be retrieved from the reaction vessel, rinsed with deionized water several times and then boiled in deionized water to remove any trace of residuals from the reaction.

One example of an oxygen permeable polymer and method of making is shown below, using 5-(2-aminoethyl)-pyrogallol as the oxygen absorbing compound and Nafion™ polymer in sulfonyl fluoride form as the sulfonyl halide monomer or polymer.

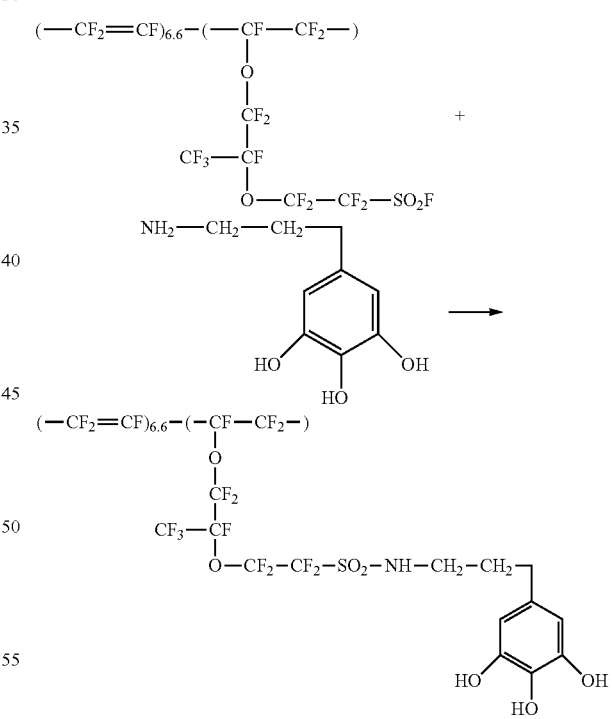

Another example of an oxygen permeable polymer and method of making is shown below, using 4-(trifluoro vinyl) benzene sulfonyl fluoride monomer as the sulfonyl halide monomer or polymer and gallic acid as the oxygen absorbing compound. Because gallic acid is a benzoic acid-based oxygen absorbing compound, the 4-(trifluoro vinyl) benzene sulfonyl fluoride monomer is first converted with ammonia to 4-(trifluoro vinyl) benzene sulfonamide monomer.

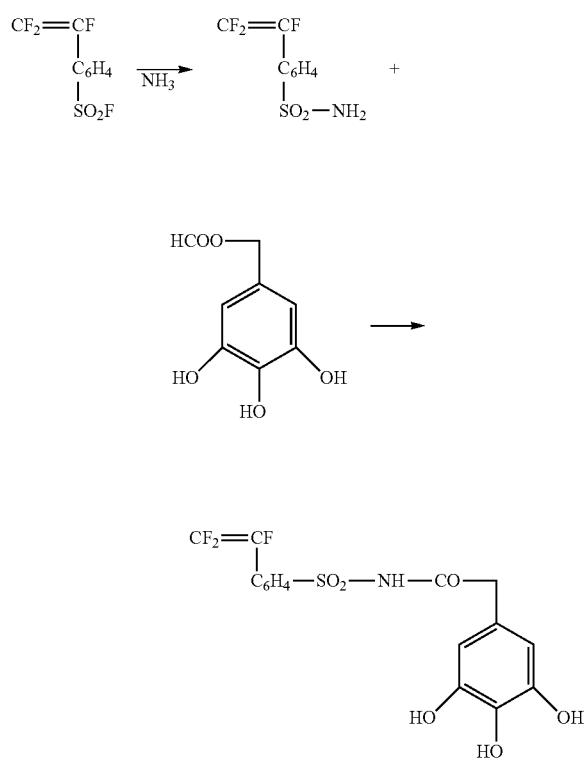

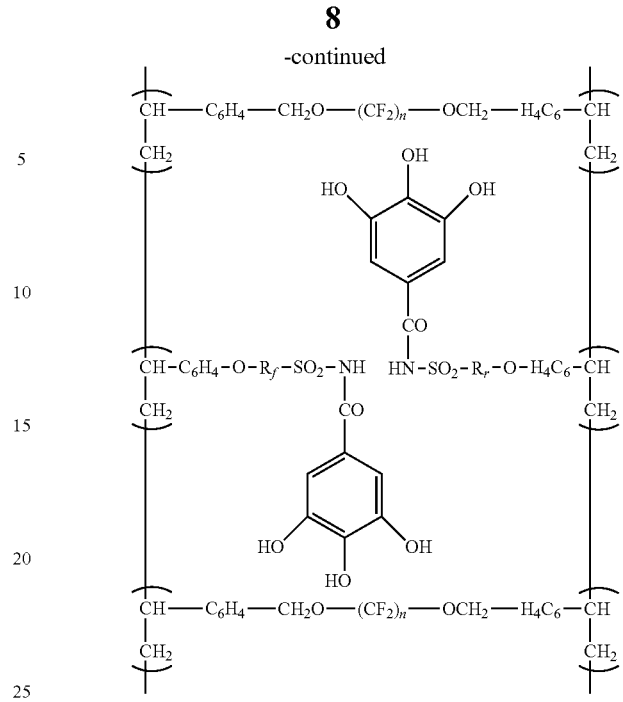

Another example of an oxygen permeable polymer and method of making is shown below, using a crosslinked polymer in sulfonyl fluoride form as the sulfonyl halide monomer or polymer and 3,4,5-trihydroxybenzaldehyde as the oxygen absorbing compound. Because 3,4,5-trihydroxybenzaldehyde is an aldehyde-based oxygen absorbing compound, the crosslinked polymer in sulfonyl fluoride form is first converted with ammonia to a crosslinked polymer in sulfonamide form, not shown.

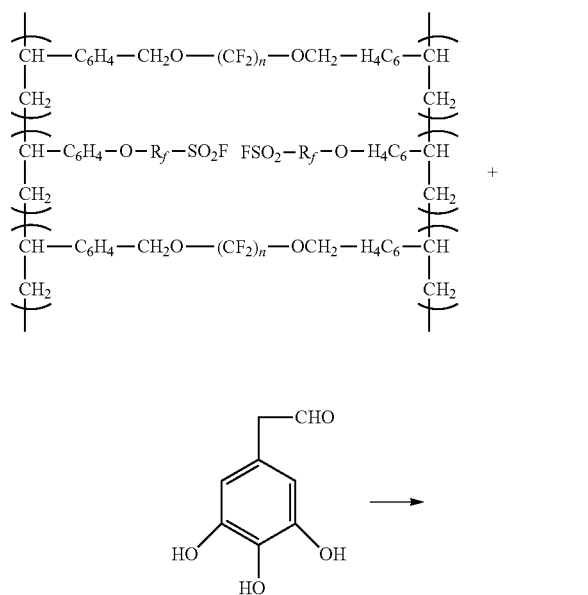

The oxygen permeable polymers disclosed herein can be used as material for air-separation devices or oxygen concentration devices for any device or process in which oxygen is used. The oxygen permeable polymers can be formed into a membrane filter through which air flows, as an example. The oxygen permeable polymers can be used in a form such as a pellet that can be used in an absorption column, for example.

The oxygen permeable polymers disclosed herein can also be used in electrodes of electrochemical devices. The oxygen permeable polymers can be mixed into the active material along with an ionomer to provide both oxygen transport and proton transport through the electrode. Alternatively, the oxygen permeable polymers disclosed herein can be further formed into an oxygen-conducting and proton-conducting ionomer for use in electrochemical cell electrodes.

The reaction producing the oxygen permeable polymer will convert some portion of the sulfonyl halide or sulfonamide sites to an oxygen permeable site, depending on the conditions in which the reaction takes place. Reaction conditions, such as length of time and temperature of the reaction, can be adjusted to convert any portion of the sulfonyl halide or sulfonamide sites to oxygen permeable sites as desired. The remaining sulfonyl halide or sulfonamide sites not converted to an oxygen permeable site can be converted to a proton conducting function group such as sulfonic acid. Accordingly, an oxygen-conducting and proton-conducting ionomer is produced.

The method of making an oxygen-conducting and proton-conducting ionomer from the oxygen permeable polymers disclosed herein comprises adding a proton conducting functional group to an unreacted portion of the sulfonyl halide monomer or polymer. The oxygen-conducting and proton-conducting ionomer has the following formula:

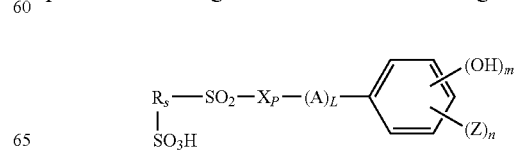

wherein $R_s$ is a non-sulfonyl halide portion of a sulfonyl halide monomer or polymer; $X_P$ is —NH or —NHCO; A is an optionally substituted alkyl; L is 0, 1 or 2; m is 2 or 3; Z is H or CH$_3$; and n is 5-m.

The proton conducting functional groups can be added by hydrolyzing the unreacted portion of the sulfonyl halide monomer or polymer with a base and an alcohol and ion exchanging the hydrolyzed unreacted portion of the sulfonyl halide monomer or polymer with an acid to form the oxygen permeable and proton conducting material.

The base can be, for example, KOH or NaOH and the alcohol can be, for example, methanol, dimethyl sulfoxide, or other ethers. For example, 15 wt. % base and 35 wt. % alcohol can be used with water being the remaining 50 wt. %. The ion exchange is with mineral acids, including, for example, HNO$_3$ or H$_2$SO$_4$.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An oxygen permeable polymer having the following formula:

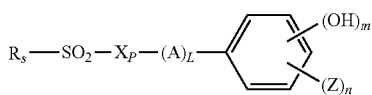

wherein $R_s$ is a non-sulfonyl halide portion of a sulfonyl halide monomer or polymer; $X_P$ is —NH or —NHCO; A is an optionally substituted alkyl; L is 0, 1 or 2; m is 2 or 3; Z is H or CH$_3$; and n is 5-m.

2. The oxygen permeable polymer of claim 1, produced from reacting the sulfonyl halide monomer or polymer with an oxygen absorbing compound having the following formula:

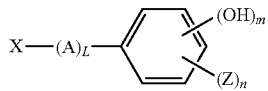

wherein X is —NH$_2$, —COOH, —COOR or —COH; and R is ether or ester.

3. The oxygen permeable polymer of claim 2, wherein the oxygen absorbing compound is a benzoic acid-based compound and the sulfonyl halide monomer or polymer is treated with ammonia to convert a sulfonyl halide portion to a sulfonamide prior to reacting with the oxygen absorbing compound.

4. The oxygen permeable polymer of claim 3, wherein the oxygen absorbing compound is gallic acid, an ester of gallic acid, an ether of gallic acid, 2,4,5-trihydroxybenzoic acid, 2,3,4-trihydroxybenzoic acid, or 3,4,5-trihydroxybenzoic acid.

5. The oxygen permeable polymer of claim 2, wherein the oxygen absorbing compound comprises 5-(2-aminoethyl)-pyrogallol, 5-(aminomethyl)benzene-1,2,4-triol, 5-(aminomethyl)benzene-1,2,3-triol, 5-(2-aminoethyl)-6-methylbenzene-1,2,4-triol, 5-(2-aminoethyl)-3-methylbenzene-1,2,4-triol, 5-(2-aminoethyl)-3,6-dimethylbenzene-1,2,4-triol, 5-(2-amino-1-hydroxyethyl)-1,2,4-benzenetriol, 4-aminobenzene-1,2,3-triol, 2,3,5-trihydroxyphenethylamine, 3,4-dihydroxyphenethylamine, 3,4,5-trihydroxyphenethylamine, 2-hydroxydopamine or 5-hydroxydopamine.

6. The oxygen permeable polymer of claim 2, wherein the oxygen absorbing compound is an aldehyde-based compound and the sulfonyl halide monomer or polymer is treated with ammonia to convert a sulfonyl halide portion to a sulfonamide prior to reacting with the oxygen absorbing compound.

7. The oxygen permeable polymer of claim 6, wherein the oxygen absorbing compound is 3,4,5-trihydroxybenzaldehyde, 2,4,5-trihydroxybenzaldehyde, 2,3,4-trihydroxybenzaldehyde, 2,4,6-trihydroxybenzaldehyde, 2,3,6-trihydroxybenzaldehyde, 2,3,5-trihydroxybenzaldehyde or 2,3,4-trihydroxyacetophenone.

8. An air separation device comprising the oxygen permeable polymer of claim 1.

9. An electrode of an electrochemical device comprising an ionomer and the oxygen permeable polymer of claim 1.

10. A battery comprising the electrode of claim 9.

11. A fuel cell comprising the electrode of claim 9.

12. The oxygen permeable polymer of claim 1, further comprising a proton conductor SO$_3$H as shown in the following formula:

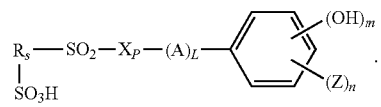

13. A method of making the oxygen permeable polymer of claim 1, comprising:
reacting under a mild base condition a sulfonyl halide monomer or polymer (1) with an oxygen absorbing compound (2) to produce the oxygen permeable polymer (3):

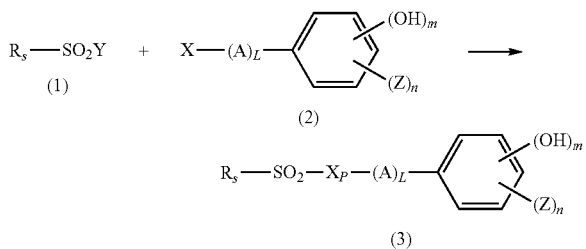

wherein:
$R_s$ is a non-sulfonyl halide portion of the sulfonyl halide monomer or polymer and Y is F or Cl;
X is —NH$_2$, —COOH, —COOR, or —COH and R is an ester or an ether;
A is an optionally substituted alkyl;
L is 0, 1 or 2;
m is 2 or 3;
Z is H or CH$_3$;
n is 5-m; and
$X_P$ is —NH or —NHCO; and
when X is —COOH, —COOR or —COH, the reacting comprises first treating the sulfonyl halide monomer or polymer with ammonia to convert a sulfonyl halide portion to a sulfonamide.

14. The method of claim 13, wherein the reacting under a mild base condition comprises:
   soaking the sulfonyl halide monomer or polymer or the sulfonamide in a solvent;
   adding a base to form the mild base condition;
   adding the oxygen absorbing compound; and
   reacting at a temperature of 100° C. or less for a period of time.

15. The method of claim 14, wherein the period of time is greater than twelve hours.

16. The method of claim 13, wherein X is —COOH or —COOR and the oxygen absorbing compound is gallic acid, an ester of gallic acid, an ether of gallic acid, 2,4,5-trihydroxybenzoic acid, 2,3,4-trihydroxybenzoic acid, or 3,4,5-trihydroxybenzoic acid.

17. The method of claim 13, wherein X is —COH and the oxygen absorbing compound is 3,4,5-trihydroxybenzaldehyde, 2,4,5-trihydroxybenzaldehyde, 2,3,4-trihydroxybenzaldehyde, 2,4,6-trihydroxybenzaldehyde, 2,3,6-trihydroxybenzaldehyde, 2,3,5-trihydroxybenzaldehyde or 2,3,4-trihydroxyacetophenone.

18. The method of claim 13, wherein X is —NH$_2$ and the oxygen absorbing compound comprises 5-(2-aminoethyl)-pyrogallol, 5-(aminomethyl)benzene-1,2,4-triol, 5-(aminomethyl)benzene-1,2,3-triol, 5-(2-aminoethyl)-6-methylbenzene-1,2,4-triol, 5-(2-aminoethyl)-3-methylbenzene-1,2,4-triol, 5-(2-aminoethyl)-3,6-dimethylbenzene-1,2,4-triol, 5-(2-amino-1-hydroxyethyl)-1,2,4-benzenetriol, 4-aminobenzene-1,2,3-triol, 2,3,5-trihydroxyphenethylamine, 3,4-dihydroxyphenethylamine, 3,4,5-trihydroxyphenethylamine, 2-hydroxydopamine or 5-hydroxydopamine.

19. A method of making an oxygen-conducting and proton-conducting ionomer, comprising the method of claim 13, and further comprising:
   adding a proton conducting functional group to an unreacted portion of the sulfonyl halide monomer or polymer, wherein the oxygen-conducting and proton-conducting ionomer has the following formula:

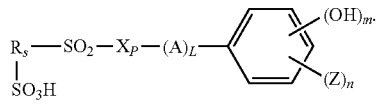

20. The method of claim 19, wherein adding the proton conducting functional group comprises:
   hydrolyzing the unreacted portion of the sulfonyl halide monomer or polymer with a base and an alcohol;
   ion exchanging the hydrolyzed unreacted portion of the sulfonyl halide monomer or polymer with an acid to form an oxygen permeable polymer and proton conducting material.

* * * * *